US006703452B2

(12) United States Patent
Huynh-Ba

(10) Patent No.: US 6,703,452 B2
(45) Date of Patent: Mar. 9, 2004

(54) COATING COMPOSITION

(75) Inventor: Gia Huynh-Ba, Hockessin, DE (US)

(73) Assignee: E. I. du Pont de Nemours and Company, Wimington, DE (US)

( * ) Notice: Subject to any disclaimer, the term of this patent is extended or adjusted under 35 U.S.C. 154(b) by 43 days.

(21) Appl. No.: 10/007,353

(22) Filed: Nov. 9, 2001

(65) Prior Publication Data

US 2002/0132934 A1 Sep. 19, 2002

Related U.S. Application Data

(63) Continuation-in-part of application No. 09/598,610, filed on Jun. 21, 2000.

(51) Int. Cl.$^7$ .............................................. C08F 283/04
(52) U.S. Cl. ..................... 525/453; 525/458; 525/28; 524/507; 524/590; 524/523; 524/528; 524/714; 524/285; 524/522; 524/538; 526/271
(58) Field of Search ................. 524/507, 590, 524/523, 528, 714, 285, 522, 538; 525/453, 458, 28; 526/271

(56) References Cited

U.S. PATENT DOCUMENTS

| | | | | |
|---|---|---|---|---|
| 3,259,511 A | 7/1966 | Rairdon et al. | ............. | 106/263 |
| 3,485,779 A | 12/1969 | Gast et al. | ............. | 160/18 |
| 3,560,235 A | 2/1971 | Sarfas et al. | ............. | 106/308 |
| 3,637,539 A | 1/1972 | Wolff et al. | ............. | 260/2.5 |
| 3,637,540 A | 1/1972 | Wolff et al. | ............ | 260/2.5 AM |
| 3,726,838 A | 4/1973 | Elmer et al. | ......... | 260/77.5 AQ |
| 3,892,687 A | 7/1975 | Bechara et al. | ........ | 260/2.5 AC |
| 3,971,764 A | 7/1976 | Schurmann et al. | | 260/77.5 AM |
| 4,267,044 A | 5/1981 | Kroplinski et al. | ...... | 210/321.2 |
| 4,274,933 A | 6/1981 | Kamada et al. | ........ | 204/159.24 |
| 4,291,097 A | 9/1981 | Kamada et al. | ............. | 428/412 |
| 4,677,029 A * | 6/1987 | Frisch et al. | ................ | 428/423 |
| 4,729,792 A | 3/1988 | Seitz | ............................ | 106/22 |
| 4,785,032 A | 11/1988 | Touhasent | .................... | 524/42 |
| 4,946,872 A | 8/1990 | Thomas et al. | ............. | 521/159 |
| 4,990,583 A | 2/1991 | Wamprecht et al. | ........ | 526/271 |
| 5,041,477 A | 8/1991 | Hays | ........................... | 524/88 |
| 5,159,051 A | 10/1992 | Onwumere et al. | ........... | 528/67 |
| 5,266,669 A | 11/1993 | Onwunaka et al. | ........... | 528/28 |
| 5,279,862 A | 1/1994 | Corcoran et al. | ........ | 427/407.1 |
| 5,286,782 A * | 2/1994 | Lamb et al. | ................ | 524/507 |
| 5,352,754 A | 10/1994 | Rhodes et al. | ................ | 528/28 |
| 5,354,797 A | 10/1994 | Anderson et al. | ........... | 524/285 |
| 5,391,630 A | 2/1995 | Miwa et al. | ................ | 525/285 |
| 5,486,561 A | 1/1996 | Hirano et al. | ............... | 524/451 |

FOREIGN PATENT DOCUMENTS

| | | |
|---|---|---|
| JP | 59213428 A | 12/1984 |
| JP | 60177013 | 9/1985 |
| WO | WO 93/03104 | 2/1993 |
| WO | WO 99/23131 | 5/1999 |

* cited by examiner

Primary Examiner—David W. Wu
Assistant Examiner—William K Cheung
(74) Attorney, Agent, or Firm—Steven C. Benjamin

(57) ABSTRACT

The present invention relates to coating compositions which can be used as the clear coat for automotive finishing or refinishing, the coating composition containing a film-forming binder which contains (A) hydroxyl-containing acrylic polymer and polyhydroxyl-tertiary amine, (B) organic polyisocyanate, and (C) catalyst, to provide a coating film which is quick to cure at ambient temperature.

15 Claims, No Drawings

COATING COMPOSITION

CROSS-REFERENCE TO RELATED APPLICATION

This application is a Continuation-in-part of application Ser. No. 09/598,610 filed on Jun. 21, 2000 pending.

BACKGROUND OF THE INVENTION

1. Field of the Invention

This invention relates to coating compositions which are especially useful for clear coating over a colored base coat.

2. Description of Related Art

U.S. Pat. No. 5,279,862 discloses a clear coating composition which can be used as the clear coat of a motorized vehicle clear coat/color coat finish. The clear coating composition has a film-forming binder and volatile organic liquid carrier, the binder including hydroxy functional acrylic polymer and organic polyisocyanate and is characterized by rapid curing to form a finish that is tack free and can be buffed as soon as 3–4 hours after application, resulting in increased productivity of the paint shop.

Even more rapid curing of the clear coat is desired for further increase in paint shop productivity. A catalyst for the hydroxy-isocyanate crosslinking reaction is present in the clear coating composition, typically an organo tin compound. When the amount of catalyst is increased to speed-up the cure, other problems arise, including decreased potlife and reduced coating quality. In the latter case, the faster cure entraps liquid carrier within the dried clear coating, causing the coating to have poor gloss and distinctness of image.

There are other indicia of increased productivity, e.g. how soon after application the film coating dries sufficiently to be dust-free, so that the painted article (vehicle) can be moved from the paint booth, to make room for the next vehicle to be painted. The vehicle can be moved outside the paint shop, i.e. into the open air, only after the film coating has dried further so as to be free of water spotting damage.

SUMMARY OF THE INVENTION

The present invention provides a coating composition which forms film coatings which provide improved productivity as determined by one or more of the indicia of rapidly becoming dust-free and water spot resistant, and/or rapid curing sufficiently to be buffed, all occuring at ambient temperature (20° C.).

The coating composition of the present invention contains a film forming binder and a volatile organic liquid carrier binder, wherein the binder contains (A) hydroxyl-containing acrylic polymer and polyhydroxyl-tertiary amine, at least two hydroxyl groups of said amine being indirectly bonded to a nitrogen atom of said amine through a chain containing at least two carbon atoms, and (B) organic polyisocyanate, the ratio of equivalents of isocyanate in (B) per equivalent of hydroxyl groups in (A) being in the range of 0.5/1 to 3.0/1, and (C) an effective amount of catalyst to cure said composition.

In the broadest sense, the present invention comprises component (A) by itself, preferably also contained in a volatile organic liquid carrier, the combination of the hydroxyl-containing acrylic polymer and polyhydroxyl-tertiary amine also constituting a film-forming binder. Components (A) and (B) are packaged separately and are combined just prior to application, because component (B) crosslinks the combined components. Component (C) speeds up the crosslinking reaction and can be provided to the crosslinking reaction either as part of (A), (B), or as a separate component. In any event, the pot-life of the combined components is sufficient to enable the combined components to be applied, typically by spraying, onto the substrate to be coated, typically an vehicle body part, including the entire vehicle body.

The curing of the composition after it is applied to form the film coating occurs by the isocyanate groups of (B) reacting with the hydroxyl groups of both the acrylic polymer and the polyhydroxyl-tertiary amine of (A) to form urethane linkages, whereby the cured coating film is a polyurethane. The polyhydroxyl-tertiary amine both speeds up the curing reaction, as does the catalyst (C), and becomes part of the crosslinked structure by the reaction of its hydroxyl groups with the isocyanate groups. Thus, the polyhydroxyl-tertiary amine is present in an effective amount to increase the crosslinking reaction rate during curing of the composition. Preferably, the amount of said acrylic polymer is 40–99 wt % and the amount of polyhydroxyl-tertiary amine is 1–60 wt %, based on the total weight of (A).

Film coatings formed from compositions of the present invention typically become dust-free within 10 min and even within 5 min, free of water spot damage within 30 min, and can be buffed in less than three hours and possibly as early as one hour after application, all with ambient temperature drying and cure, without sacrifice in either the ease of applying the coating composition or the ultimate quality of the clear coat. Of course, the film coating becomes tack-free prior to becoming buffable.

Thus, the coating compositions of the present invention are highly useful for repairing a clearcoat/colorcoat finish of a vehicle using the coating composition as a refinish clearcoat, which process allows the vehicle to be moved outside and the finish to be sanded (wet or dry), buffed or polished, if necessary, to remove minor imperfections and enhance gloss within a short period of time after application. This greatly improves the productivity of a refinish operation by allowing more vehicles to be processed in the same or in less time.

DETAILED DESCRIPTION OF THE INVENTION

The coating composition of this invention is a low VOC (volatile organic content) composition that is particularly suited for use as a clearcoat in automotive refinishing. The composition contains a film forming binder and an organic liquid carrier which is usually a solvent for the binder. Since the invention is directed to a low VOC composition, the amount of organic solvent used in the liquid carrier portion results in the composition having a VOC content of less than 0.6 kilograms per liter (5 pounds per gallon) and preferably in the range of about 0.25–0.53 kilograms (2.1–4.4 pounds per gallon) of organic solvent per liter of the composition, as determined under the procedure provided in ASTM D-3960. This usually translates to a film forming binder content (components (A)+(B)+(C)) of about 25–90% by weight and an organic liquid carrier content of about 10–75% by weight, preferably about 30–55% by weight binder and 45–70% by weight carrier. Component (A), by itself can have the same solids content in organic liquid carrier, with or without the presence of component (C) in component (A). "Solids content" as used herein refers to the film-forming binder content of the composition, i.e. although the binder is in solution in the carrier, upon evaporation of the carrier, solid coating film of the binder remains.

The hydroxyl functional acrylic polymer used in the hydroxyl component of the binder is prepared by conventional solution polymerization techniques in which monomers, solvents and polymerization catalyst are charged into a conventional polymerization reactor and heated to about 60–200° C. for about 0.5–6 hours to form a polymer having a weight average molecular weight (Mw) of preferably about 2,000–13,000, more preferably about 3,000–11,000.

All molecular weights disclosed herein are determined by GPC (gel permeation chromatography) using polymethyl methacrylate standard, unless otherwise noted.

The acrylic polymer thus formed also has a glass transition temperature (Tg) generally of at least 20° C. and preferably about 40–80° C.

All glass transition temperatures disclosed herein are determined by DSC (differential scanning calorimetry).

Typically useful polymerization catalysts are azo type catalysts such as azo-bis-isobutyronitrile, 1,1'-azo-bis (cyanocylohexane), acetates such as t-butyl peracetate, peroxides such as di-t-butyl peroxide, benzoates such as t-butyl perbenzoate, octoates such as t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, such as butyl acetate, and mixtures of any of the above.

The hydroxyl functional acrylic polymer is preferably composed of a mixture of monomers, predominantly (meth) acrylic which copolymerize together to provide the application and cured coating film characteristics desired polymerized. In accordance with the present invention it is important that the acrylic polymer also contain hydroxyl groups provided by one or more comonomers used to form the acrylic polymer. The preferred mixture of comonomers is styrene, a methacrylate which is either methyl methacrylate, isobornyl methacrylate, cyclohexyl methacrylate or a mixture of these monomers, a second methacrylate monomer which is either n-butyl methacrylate, isobutyl methacrylate or ethyl hexyl methacrylate or a mixture of these monomers and a hydroxy alkyl methacrylate or acrylate that has 1–8 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like.

A preferred acrylic polymer contains about 5–30% by weight styrene, 1–50% by weight of the methacrylate, 30–60% by weight of the second methacrylate and 10–40% by weight of the hydroxy alkyl methacrylate. The total percentage of monomers in the polymer equal 100%. One particularly preferred acrylic polymer contains the following constituents in the above percentage ranges: styrene, methyl methacrylate, isobutyl methacrylate and hydroxy ethyl methacrylate. Another preferred acrylic polymer contains the following constituents in the above percentage ranges: styrene, isobornyl methacrylate, ethyl hexyl methacrylate, hydroxy ethyl methacrylate and hydroxy propyl methacrylate. Still another preferred acrylic polymer contains the following constituents in the above percentages: styrene, methyl methacrylate, isobornyl methacrylate, ethyl hexyl methacrylate, isobutyl methacrylate, and hydroxy ethyl methacrylate. Most preferably, compatible blends of two or more of the above acrylic polymers are used.

Optionally, the acrylic polymer can contain about 0.5–2% by weight, based on the weight of acrylic polymer, of acrylamide or methacrylamide such as n-tertiary butyl acrylamide or methacrylamide, copolymerized with the acrylic polymer.

The polyhydroxyl-tertiary amine is present in (A) as a mixture with the acrylic polymer in solution in the liquid carrier. Its essential components are the presence of at least one tertiary amine nitrogen atom and a plurality of hydroxyl groups, with at least two of the hydroxyl groups being bonded to at least one of the nitrogen atoms via a bifunctional group which contains at least two carbon atoms, i.e. the —OH substitution is no closer than beta to the nitrogen atom. The bifunctional group can be an aliphatic group preferably containing 2 to 12 carbon atoms. When the tertiary amine has two nitrogen atoms, preferably at least one —OH group is indirectly substituted onto each nitrogen atom as described above. The polyhydroxyl-tertiary amine is non-reactive with the acrylic polymer and can be used in the composition of the present invention as a single polyhydroxyl-tertiary amine or as a mixture of different polyhydroxyl-tertiary amines. Polyhydroxyl-tertiary amines that can be used in the composition of the present invention include those represented by the formula

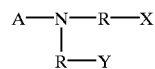

wherein R is alkylene or oxyalkylene containing 0 to 6 carbon atoms and X and Y are independently $R_1H$, wherein $R_1$ is —$(CH_2CH_2O)_n$—, —$(CH_2C(CH_3)HO)_n$—, —$(CH_2C([CH_2]_mCH_3)HO)_n$— wherein m is an integer of 1–5, or $(CH_2C(C_6H_{11})HO)_n$—, or any combination thereof, wherein n is an integer of 1–3, and A is R—X, R—Y, $R_2$ or Z, wherein $R_2$ is an alkyl group containing 1–20 carbon atoms and Z is

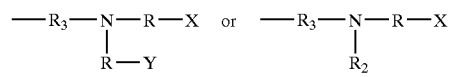

wherein $R_3$ is an alkylene group containing 1 to 10 carbon atoms or a cycloalkylene or arylene group containing 3 to 21 carbon atoms, with the proviso that at least two, preferably at least three, —OH groups (provided by $R_1H$) are present.

Preferably, R when present is alkylene or oxyalkylene containing 0 to 4 carbon atoms, $R_1$ is —$(CH_2CH_2O)_n$—, —$(CH_2C(CH_3)OH)_n$, or $CH_2C(CH_2CH_3)HO)_n$—, wherein n is 1 or 2, $R_2$ is an alkyl group containing 1 to 20 carbon atoms, and $R_3$ is an alkylene group containing 1 to 6 carbon atoms or a cycloalkylene or arylene group containing 3 to 21 carbon atoms. The combination of R and $R_1$ form one embodiment of aliphatic group indirectly connecting the —OH group to the nitrogen atom.

Examples of polyhydroxyl-tertiary amines include simple compounds such as N,N-diethanol alkyl amine, triethanol amine and more complicated compounds which can be considered as oligomers, such as the Ethomeen® (one tertiary amine nitrogen atom) and Ethoduomeen® (two tertiary amine nitrogen atoms) compounds available from Akzo Nobel. Examples of these compounds in which only one tertiary amine nitrogen is present are represented by the formula

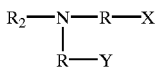

Wherein $R_2$, R, X, and Y have the same meaning as described above and wherein $R_2$ preferably has 8 to 20 carbon atoms. Examples of group $R_2$ are tallow, oleyl, coco, and soya. A preferred group of compounds are the diethoxylates characterized by the formula

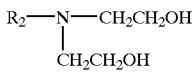

Wherein $R_2$ contains 8–20 carbon atoms. Examples of compounds containing two tertiary amine nitrogen atoms include the Ethoduomeens such as the compound having the formula

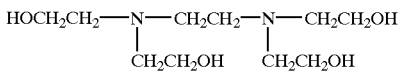

and the compounds having the formula

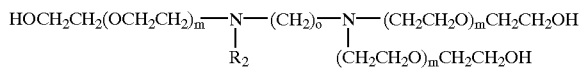

Wherein m is an integer independently selected from the group 0, 1, or 2, and o is an integer of from 1 to 4.

In the Ethomeen® and Ethoduomeen® compounds containing the $R_2$ group, such group is a mixture of alkyl groups as shown in the following Table A.

Examples of other useful polyhydroxyl-tertiary amines containing two tertiary amine nitrogen atoms include compounds having the formula:

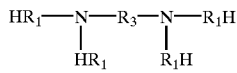

wherein $R_1$ is —$(CH_2CH_2O)_n$—, —$(CH_2C(CE_3)OH)_n$—, or —$(CH_2C(CH_2CH_3)HO)_n$—, n is 1 or 2, and $R_3$ is a cycloalkylene radical from the group of:

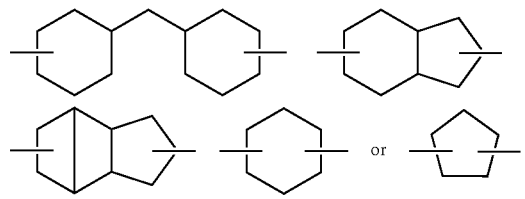

The combination of the hydroxyl-containing acrylic polymer and the polyhydroxyl-tertiary amine (component (A)) crosslinked with the polyisocyanate (component (B)) to be described hereinafter produces a clear, tough glossy film coating. The proportions of the acrylic polymer and polyhydroxyl-tertiary amine required to produce this result, along with quick curing will depend on the particular acrylic polymer and polyhydroxyl-tertiary amine selected, and to some extent on the particular polyisocyanate selected. Preferably, however, an effective amount of the polyhydroxyl-tertiary amine will be present to reduce the curing time so that water spot damage does not occur after one hour after application of the coating, followed by drying at ambient temperature (20° C.). Typically, the amount of polyhydroxyl tertiary amine needed to achieve this goal will be from 1 to 20 wt % of component (A).

Component (A) can further contain a hydroxyl-terminated polyester such as that having a weight average molecular weight (Mw) not exceeding about 3,000 (oligomer), preferably about 200–2,000, and a polydispersity (Mw divided by Mn) of less than about 1.7.

Typically useful such oligomers include caprolactone oligomers containing terminal hydroxyl groups which may be prepared by initiating the polymerization of caprolactone

TABLE A

| | Approximate Alkyl Wt. % Distribution | | | | | | | | | |
|---|---|---|---|---|---|---|---|---|---|---|
| Alkyl | Decyl | Dodecyl | Hexadecyl | Octadecyl | Oleyl | Oleyl | Coco | Soya | Tallow | Hydrogenated Tallow |
| Saturated | | | | | | | | | | |
| C8 | 4 | | | | | | 6 | | | |
| C10 | 90 | 1 | | | | | 7 | | | |
| C12 | 6 | 95 | | | 0.5 | 0.5 | 51 | 0.5 | | |
| C14 | | 3 | | | 1.5 | 1.5 | 19 | 1 | 3 | 3.5 |
| C15 | | | 0.5 | | | | | 0.5 | 0.5 | |
| C16 | | 1 | 91 | 9 | 4 | 4 | 9 | 16 | 29 | 31 |
| C17 | | | 1.5 | 2 | 0.5 | 0.5 | | | 1 | 1 |
| C18 | | | 7 | 87 | 14 | 8 | 2 | 15 | 20 | 61 |
| Unsaturated | | | | | | | | | | |
| C14' | | | | | 0.5 | 0.5 | | | 0.5 | |
| C16' | | | | | 4 | 4 | | 1 | 2 | |
| C18' | | | | 2 | 70 | 74 | 6 | 49.5 | 44 | 3 |
| C18" | | | | | 5 | 7 | | 13 | | | with a cyclic polyol, particularly a cycloaliphatic polyol, in the presence of a tin catalysts via conventional solution polymerization techniques. Such caprolactone oligomers are well known and described at length in Anderson et al. U.S. Pat. No. 5,354,797, issued Oct. 11, 1994. Epsilon($\epsilon$)-caprolactone is typically employed as the caprolactone component in a 1/1 to 5/1 molar ratio with a cycloaliphatic diol. Typically useful cycloaliphatic polyol monomers include 1,4-cyclohexanediol, 1,4-cyclohexane dimethanol, and 2,2'-bis(4-hydroxycyclohexyl) propane. Preferred caprolactone oligomers are formed from caprolactone and 1,4-cyclohexanedimethanol reacted in a molar ratio of 2/1 to 3/1.

Other useful oligomers include alkylene oxide polyester oligomers containing terminal hydroxyl groups which may be made by reacting stoichiometric amounts of a cycloaliphatic monomeric anhydride with a linear or branched polyol in solution at elevated temperatures in the presence of a tin catalyst using standard techniques and then capping the acid oligomers so formed with monofunctional epoxies, particularly alkylene oxide, under pressure above atmospheric but not exceeding about 200 psi and at temperatures of 60–200° C. for 1 to 24 hours. Such alkylene oxide oligomers are well known and described at length in Barsotti et al. PCT Application No. US98/23337, published May 14, 1999.

Cycloaliphatic anhydride monomers such as hexahydrophthalic anhydride and methyl hexahydrophthalic anhydride are typically employed in the alkylene oxide oligomers above. Aliphatic or aromatic anhydrides, such as succinic anhydride or phthalic anhydride may also be used in conjunction with the anhydrides described above. Typically useful linear or branched polyols include, hexanediol, 1,4-cyclohexane dimethanol, trimethylol propane, and pentaerythritol. Useful monofunctional epoxies include alkylene oxides of 2 to 12 carbon atoms. Ethylene, propylene and butylene oxides are preferred although ethylene oxide is most preferred. Other epoxies, such as "Cardura" E-5 or "Cardura" E-10 glycidyl ether, supplied by Exxon Chemicals, may be used in conjunction with the monofunctional epoxies described above. Particularly preferred alkylene oxide oligomers are formed from methyl hexahydrophthalic anhydride; either 1,4-cyclohexanedimethanol, trimethylol propane, or pentaerythritol; and ethylene oxide reacted in stoichiometric amounts.

Compatible blends of any of the aforementioned hydroxyl-terminated polyesters can be used as well in the hydroxyl component (A) of the binder. Generally, 0 to 39 wt %, based on the total weight of component (A) of the hydroxyl-terminated polyester will be present, and preferably the amount will be 1 to 20 wt %.

The polyisocyanate component of the binder includes an organic polyisocyanate as the crosslinking agent. The organic polyisocyanate can be a single polyisocyanate or a blend of different polyisocyanates.

Any of the conventional aromatic, aliphatic, cycloaliphatic diisocyanates, trifunctional isocyanates and isocyanate functional addition compounds of a polyol and a diisocyanate may be used as or in the polyisocyanate component (B).

Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis (4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of other diisocyanates also can be used such as the trimer of hexamethylene diisocyanate (HDI) which is sold under the tradename "Desmodur" N-3300 or N-3390 or "Tolonate" HDT or HDT-LV. Trimer of isophorone diisocyanate (IPDI) can also be used. In forming the trimer from isophorone diisocyanate, one of the isocyanate groups forms an isocyanurate group; the resultant trimer, however, has three isocyanate groups. Typically useful IPDI trimers are sold under the tradenames "Desmodur" Z-4470 BA or SN/BA or SN or MPA/X. The IPDI trimer offers the resulting coating improved hardness on curing.

In the present invention, the polyisocyanate component (B) contains 0%, but preferably at least 3% up to about 50% by weight, more preferably about 5–30% by weight, of the IPDI trimer, based on the weight of component (B). Excessive IPDI trimer tends to cause the film coating to become too brittle, whereby the coating film will crack over time.

Isocyanate functional addition compounds can also be used that are formed from an organic polyisocyanate and a polyol (the reaction forming the addition compound uses up the =OH groups of the polyol). Any of the aforementioned polyisocyanates can be used with a polyol to form an addition compound. Polyols such as trimethylol alkanes like trimethylol propane or ethane can be used. One useful adduct is the reaction product of tetramethylxylidene diisocyanate and trimethylol propane and is sold under the tradename "Cythane" 3160.

One particularly preferred polyisocyanate crosslinking component comprises a mixture of about 5–45% by weight IPDI trimer and about 55–95% by weight HDI trimer, based on the total weight of component (B). The preferred amount of IPDI trimer for use in combination with HDI trimer is 5 to 25 wt %. It is generally preferred to employ an HDI trimer in combination with the IPDI trimer to retain flexibility in the coating film.

The hydroxyl and polyisocyanate components (A) and (B), respectively are preferably employed in an equivalent ratio of isocyanate groups to hydroxyl groups of 0.8/1 to 2.0/1. The coating composition also contains a sufficient amount of catalyst to cure the composition at ambient temperature. A combination of certain catalysts is preferred when IPDI trimer is present, to accelerate the curing rate of IPDI trimer at room temperature to achieve the high film hardness offered by IPDI in a relatively short period of time, with little or no pot life reductions or die-back in the coating film formed therefrom. Even at these accelerated curing rates, the coating compositions remains processable for at least 30 minutes at ambient temperatures which provides enough time to complete the refinish job without the need for viscosity adjustments, and the high gloss coating film formed therefrom shows virtually no signs of dying back to a dull fuzzy finish over time.

The catalyst comprises at least one organotin tin compound, optionally at least one tertiary amine, and optionally, at least one organic acid in amounts described below (catalyst system).

Typically useful organotin compounds include organotin carboxylates, particularly dialkyl tin carboxylates of aliphatic carboxylic acids, such as dibutyl tin dilaurate (DBTDL), dibutyl tin dioctoate, dibutyl tin diacetate, and the like. Although not preferred, any of the other customary organotin or organometallic (Zn, Cd, Pb) catalysts could also be used. The amount of organotin catalyst employed in the coating composition can vary considerably depending on the specific binder system and the degree of initial hardness desired. However, it is critical that the coating composition contains enough organotin catalyst to cure the composition at ambient temperatures, while at the same time being insufficient to cause die-back.

Generally, about 0.005–0.2% by weight, based on the weight of the binder (components (A)+(B)+(C)), of organotin catalyst will be sufficient to impart the desired properties. It has been found that above the upper limit of 0.2%, the curing reaction is too fast and die-back results. Below about 0.005%, the curing reaction is too slow and insufficient hardness and poor mechanical properties develop. The organotin catalyst can be used by itself as the sole catalyst ingredient.

Typically useful tertiary amines useful as a co-catalyst in catalyst component (C), as distinguished from the polyhydroxyl-tertiary amine used in component (A), include tertiary aliphatic monoamines or diamines, particularly trialkylene diamines, such as triethylene diamine (DABCO), N-alkyl trimethylenediamine, such as N,N,N'-trimethyl-N'-tallow-1,3-diaminopropane, and the like; and trialkylamines such as tridodecylamine, trihexadecylamine, N,N'-dimethylalkyl amine, such as N,N'-dimethyldodecyl amine, and the like, all free of —OH groups. The alkyl or alkylene portions of these amines may be linear or branched and may contain 1–20 carbon atoms. Especially preferred are amines that contain at least 6 carbon atoms in at least one of their alkyl or alkylene portions to lower the hazing in humid conditions.

As with the amount of organotin compound, the amount of tertiary amine in the catalyst system employed in the coating composition can vary considerably, it being desired only that tertiary amine if present, be present in an amount which, together with the above, including component (A), will cause the composition to cure at ambient temperature within three hours, preferably within two hours. Generally, about 0.01–1% by weight, based on the weight of the binder, of tertiary amine will be sufficient to impart the desired properties. Above the upper limit of about 1%, the tertiary amine offers longer dust drying times and provides the film with insufficient hardness. Below about 0.01%, the catalytic effect is generally inadequate.

An organic acid is also included in the catalyst system for increased pot life. A pot life of at least 30 minutes at ambient temperatures is generally sufficient for completion of a refinish job. Typically useful acid catalysts are formic acid, acetic acid, proponic acid, butanoic acid, hexanoic acid, and any other aliphatic carboxylic acid, and the like. Generally, about 0.005–1%, based on the weight of the binder, of acid is employed.

It has been found that the three-component catalyst system described above offers a higher cure response than organotin, amine, or acid alone.

To improve weatherability of the composition about 0.1–10% by weight, based on the weight of the binder, of ultraviolet light stabilizers screeners, quenchers and antioxidants can be added. Typical ultraviolet light screeners and stabilizers include the following:

Benzophenones such as hydroxy dodecyloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxyphenyltriazole and the like.

Hindered amines such as bis(1,2,2,6,6 entamethyl-4-piperidinyl sebacate), di[4(2,2,6,6,tetramethyl piperidinyl)] sebacate and the like and any mixtures of any of the above.

Generally, flow control agents are used in the composition in amounts of about 0.01–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the clear coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

The coating composition of the present invention also contains the customary organic solvents in the organic liquid carrier portion. As previously described, the amount of organic solvent(s) added depends upon the desired binder level as well as the desired amount of VOC of the composition. Typical organic solvents consist of aromatic hydrocarbons, such as petroleum naphtha or xylenes; ketones, such as methyl amyl ketone, methyl isobutyl ketone, methyl ethyl ketone, or acetone; esters, such as butyl acetate or hexyl acetate; and glycol ether esters, such as propylene glycol monomethyl ether acetate. Examples of solvents which do not contribute to the VOC of the composition include methyl acetate, acetone, 1-chloro, 4-trifluoromethyl benzene, and potentially t-butyl acetate.

The coating composition of this invention is preferably prepared as a "two-component" or "two-pack" coating composition, wherein the two reactive binder components (A) and (B) are stored in separate containers, which are typically sealed. The catalyst (component (C), organic solvent, and usual other additives may be added to either or both the hydroxyl or crosslinking components, depending upon the intended use of the composition. However, these additives (except for some solvent) are preferably added to and stored in the same container with the hydroxyl component (A). The contents of the hydroxyl and isocyanate component containers are mixed in the desired NCO/OH ratio just prior to use to form the activated coating composition, which has a limited pot life. Mixing is usually accomplished simply by stirring at room temperature just before application. The coating composition is then applied as a layer of desired thickness on a substrate surface, such as an autobody part, including the entire autobody. After application, the layer dries and cures to form a coating on the substrate surface having the desired coating properties.

Generally, the coating composition of this invention is used as a clearcoat in automotive refinishing, but it should be understood that it can also be used as a clearcoat finish or can be pigmented with conventional pigments and used as a monocoat or as a basecoat in a clearcoat/colorcoat finish or refinish.

In the application of the coating composition as a clearcoat refinish to a vehicle part such as an automobile or a truck body or portion thereof, the basecoat which may be either a solvent based composition or a waterborne composition is first applied and then dried sufficiently to form a stable basecoat for the clear coat before the clearcoat is applied usually wet-on-wet by conventional spraying. Electrostatic spraying also may be used. In refinish applications, the composition is preferably dried and cured at ambient temperatures but can be forced dried and cured in paint booths equipped with heat sources at slightly elevated booth temperatures of, in general, about 30–100° C., preferably about 35–65° C., for a short time of about 3–30 minutes, preferably about 5–15 minutes. The coating so formed is typically about 0.5–5 mils (0.012 to 0.12 mm) thick.

In these refinish applications, in particular, the clearcoat of this invention has been found to greatly improve the productivity of a refinish operation. Through incorporation of a mixture of hydroxy-containing polyacrylic resin, polyhydroxyl-tertiary amine, polyisocyanate, preferably containing some IPDI trimer, and effective catalysts, the composition when used as a clearcoat dries and cures in a relatively short time after application to a dust free, water resistant, and sufficiently hard state for sanding (wet or dry) or buffing, unexpectedly with minimum pot life reductions and without die-back consequences, which allows the vehicle to be buffed, moved out of the way, and delivered to the customer on the same day of application, in comparison to the next day offered by conventional clear coat compositions. The composition of this invention, in particular, exhibits a pot life of at least 30 minutes at ambient temperature, dust free time within 10 minutes or less at ambient temperatures, and water spot free and wet sand or buff time within 3 hours, preferably within 2 hours, and even as soon as one hour, at ambient temperatures. The foregoing properties can be achieved much faster by curing the composition at slightly elevated temperatures of, in general, about 55–65° C. peak substrate temperature for about 3–10 minutes, and preferably about 60° C. for about 6 minutes, which remarkably allows the clear finish to be sanded or buffed immediately on cool down. Furthermore, the finish remains sandable or buffable for several days up to one week before it cures to a tough, hard durable exterior automotive finish.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, thermoplastic olefin (TPO), reaction injection molded urethanes and partially crystalline polyamides, as well as wood and aluminum substrates.

EXAMPLES

Test Procedures

The following test methods were used to evaluate the coatings:

The film hardness is another indication of when the coating film is ready to be sanded, buffed or polished. The coating film alone must have a Persoz hardness of at least 35 sec (counts), preferably in the range of about 40–150 counts, at a film thickness of 2.2 mils when measured on a previously uncoated cold rolled steel (Q) panel before it can be sanded, buffed or polished, and this is the criterion and test conditions used in the Examples. Persoz hardness is determined by a GARDCO® Pendulum Hardness Tester Model HA-5854 manufactured by BYK Chemie, Germany and sold by Paul N. Gardness Company, Inc. Pompano Beach, Fla.

The coating must also be water spot free before it is ready to be wet sanded or stored in the rain. If water spot damage is formed on the film, this is an indication that the cure is not complete and further curing is needed before the film can be wet sanded or exposed to rainy weather conditions. The water spot free time was determined by putting a water drop on the refinish film for every 15 min and up to 24 hours. The water will damage the film if it is not sufficiently cured. As a consequence, the water drop will form a damage ring on the refinish panel. The degree of damage is rated from 1 to 10 scale. A score of 10 indicates no damage while 1 indicates severe water spotting.

The die-back was determined visually by one skilled in the art. One skilled in the art compares the initial gloss and DOI (distinctness of image) of the coating film with the gloss and DOI after the film is allowed to dry overnight. If there is a significant drop in the gloss and DOI levels, such that the coating film has a dull fuzzy appearance, die-back is said to result.

Example 1

Hydroxyl-containing acrylic polymer (acrylic polymer 1) was prepared by charging the following constituents into a polymerization reactor equipped with a heating mantel, a stirrer, thermometer, addition funnel, nitrogen purge and reflux condenser.

|  | Parts By Weight |
| --- | --- |
| Portion 1 |  |
| Xylene | 56 |
| Portion 2 |  |
| Methyl ethyl ketone | 10 |
| Styrene monomer | 15 |
| Isobutyl methacrylate monomer | 45 |
| Methyl methacrylate monomer | 20 |
| Hydroxy ethyl methacrylate monomer | 20 |
| Portion 3 |  |
| T-butyl peracetate solution (75% solids in mineral spirits) | 3.0 |
| Total | 170 |

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting acrylic polymer solution had a polymer solids content of about 60%. The polymer had a weight average molecular weight (Mw) of about 10,500 and a glass transition temperature (Tg) of about 58° C.

A tetrahydroxyl-terminated polyester oligomer (oligomer 1) was prepared by charging the following constituents into a high pressure reaction vessel and heated to 140° C.

| Ingredients | Weight (grams) |
| --- | --- |
| Propylene glycol monoethyl ether acetate | 240 |
| Pentaerythritol | 136 |
| Triethylamine | 0.23 |

To the reaction vessel, 645 gm of methylhexahydrophthalic anhydride was then added over one hour. The batch was held at 140° C. for 6 hr. The batch was then cooled to 25° C., the reaction vessel was then sealed, and 173 gm of ethylene oxide was added, followed by heating the batch to 110° C. and holding at that temperature for 6 hr. Excess ethylene oxide was then removed by purging the batch with nitrogen. The acid number of the resultant oligomer (solids) was 10 mg KOH/gm. The resulting solution of oligomer 1 had an 80% by wt. solids content.

The oligomer was tetrahydroxy-substituted and these were all primary functionalities. The oligomer also had a Mw of about 1,000, a Tg of about 0° C., and a polydispersity (Pd) of about 1.1.

The polyhydroxyl-tertiary amine used in this Example was triethoxylated N-tallow-1,3-diaminopropane available as Ethoduomeen® T/13 by Akzo Nobel Co. It has 3 hydroxyl groups and 2 tertiary amines. For simplicity, this is called oligomer 2.

A clear coating composition was prepared by first preparing the two concentrates described below.

Concentrate 1

| Ingredient | Parts by weight |
|---|---|
| Xylene | 3.8 |
| Ethyl acetate | 2.0 |
| N,N-dimethyl dodecyl amine | 0.32 |
| Tinuvin ® 292 ((1,2,2,6,6-pentamethyl-4-piperidenyl)-sebacate) | 0.58 |
| Tinuvin ® 328 (2-(2-hydroxy-3,5-ditertiary amyl phenyl)-2H-benzotriazole) | 0.58 |
| Byk ® 325 (polysiloxane polyether copolymer) | 0.386 |
| Dibutyl tin laurate | 0.04 |
| Toluene | 2.94 |
| Methyl ethyl ketone | 5.88 |
| Acetone | 47.06 |
| Acetic acid | 0.164 |
| Triethylenediamine | 0.04 |
| Total | 63.75 |

Concentrate 2

| Ingredient | Parts by Weight |
|---|---|
| Ethylacetate | 2.4 |
| Tinuvin ® 292 (described above) | 0.58 |
| Tinuvin ® 328 (described above) | 0.58 |
| Byk ® 325 (described above) | 0.386 |
| Dibutyl tin laurate | 0.04 |
| Toluene | 2.94 |
| Methyl ethyl ketone | 5.88 |
| Acetic acid | 0.164 |
| Total | 60 |

These concentrates were then used to form the following resin binder components of clear coating compositions:

Component 1, Case 1

| | Parts by Weight |
|---|---|
| Concentrate 1 | 64 |
| Acrylic polymer 1 solution | 100 |
| Butyl acetate | 26 |
| Total | 190 |

Component 1, Case 2

| | Parts by Weight |
|---|---|
| Concentrate 1 | 64 |
| Acrylic Polymer 1 solution | 95 |
| Butyl acetate | 26 |
| Oligomer 1 solution | 3.5 |
| Total | 188.5 |

Component 1, Case 3

| | Parts by Weight |
|---|---|
| Concentrate 1 | 64 |
| Acrylic Polymer 1 solution | 95 |
| Butyl acetate | 26 |
| Oligomer 2 | 3.0 |
| Total | 188 |

Component 1, Case 4

| | Parts by Weight |
|---|---|
| Concentrate 2 | 60 |
| Acrylic polymer 1 solution | 100 |
| Butyl acetate | 26 |
| Total | 186 |

Component 1, Case 5

| | Parts by Weight |
|---|---|
| Concentrate 2 | 60 |
| Acrylic polymer 1 solution | 95 |
| Butyl acetate | 26 |
| Oligomer 1 solution | 3.5 |
| Total | 184.5 |

Component 1, Case 6

| | Parts by Weight |
|---|---|
| Concentrate 2 | 60 |
| Acrylic polymer 1 solution | 95 |
| Butyl acetate | 26 |
| Oligomer 2 | 3.0 |
| Total | 184 |

The polyisocyanate component (component 2) of the clear coating composition was prepared having two different compositions, as follows:

Component 2, Case 1–3

|  | Parts by Weight |
|---|---|
| Desmodur ® N-3300 (1,6-hexamethylene Diisocyanate trimer, 100% solids) | 21 |
| Butyl acetate | 9 |
| Methyl amyl isoketone | 5 |
| Total | 35 |

Component 2, Case 4–6

|  | Parts by Weight |
|---|---|
| Desmodur ® N-3000 (as described above) | 18.9 |
| Desmodur ® Z-4470BA (isophorone diisocyanate Trimer in butyl acetate, 70% solids) | 3 |
| Butyl acetate | 8.1 |
| Methyl amyl isoketone | 5 |
| Total | 35 |

To form the clear coating compositions, Component 2 was mixed with Component 1, Cases 1–3, and with Component 2, Cases 4–6 as indicated above, to form 6 clear coating compositions, in the following weight ratios:

| Coating Composition | Component 1 | Component 2 Case 1–3 | Component 2 Case 4–6 |
|---|---|---|---|
| 1 | 190 | 35 | — |
| 2 | 188.5 | 35 | — |
| 3 | 188 | 35 | — |
| 4 | 186 | — | 35 |
| 5 | 184.5 | — | 35 |
| 6 | 184 | — | 35 |

Each of these compositions had a VOC content within the range of 4.26–4.27 (0.51 kg solvent/composition) and a binder solids content of 37.3 wt %. Each composition also had the weight ratio of ingredients: Component 1-100-95 acrylic polymer/0–5 oligomer and Component 2-0-10 IPDI trimer/100-90 HDI. Each composition had an NCO/OH equivalent ratio of 1.2–1.05. Further details of each composition and the results of spraying onto test panels are described in the following table in which compositions 3 and 6 are examples of compositions of the present invention:

TABLE 1

| Coating Composition | 1 | 2 | 3 | 4 | 5 | 6 |
|---|---|---|---|---|---|---|
| Acrylic polymer 1 (wt %) | 100 | 95 | 95 | 100 | 95 | 95 |
| Oligomer 1 (wt %) | 0 | 5 | 0 | 0 | 5 | 0 |
| Oligomer 2 (wt %) | 0 | 0 | 5 | 0 | 0 | 5 |
| IPDI trimer (wt %) | 0 | 0 | 0 | 10 | 10 | 10 |
| Water Spot (10 = best) |  |  |  |  |  |  |
| After 30 min | 5 | 4 | 9.9 | 5 | 4 | 7 |
| After 45 min | 8 | 7 | 10 | 7 | 7 | 10 |
| After 75 min | 10 | 9.5 | 10 | 10 | 9 | 10 |
| Persoz hardness (sec) |  |  |  |  |  |  |
| After 3 hr | 35 | 30 | 65 | 32 | 48 | 42 |
| After 24 hr | 108 | 134 | 128 | 151 | 148 | 143 |

In Table 1, the wt % of acrylic polymer, oligomer 1 and oligomer 2 are relative to each other (Component 1) and the wt % of IPDI trimer is relative to the total amount of polyisocyanate (Component 2), all on a solids basis. The water spot test was conducted at 77° F. (25° C.)/65%RH, and the Hardness test was carried out on the film (2.2 mil (0.55 mm) thick) after air drying at ambient temperature.

As shown in the Table, all of the clear coating compositions exhibited acceptable water spot resistance and hardness after sufficient passage of time, 75 min and 24 hr, respectively. Compositions 3 and 6 of the present invention, however, exhibited acceptable water spot resistance in just 45 min after application of the composition to the test panel. In fact, composition 3 reached this goal in only 30 min after application of the composition to the test panel. Compositions 3 and 6 thus embody the productivity advantage of enabling a vehicle coated with these compositions to be moved more quickly out of the paint shop and into the open air, even if rain is falling or may fall. Composition 3 also exhibited the best hardness after 3 hrs, while the 3-hour hardness of achieved by composition 6 was also greater than that for compositions 1,2 and 4. The film coating formed from composition 3 was ready for buffing (Persoz hardness of at least 35) in about 1½ hr. Composition 5 achieved greater early hardness than composition 6 but with a great sacrifice in water spot resistance. Compositions 3 and 6 also became dust free after application to the test panel faster than the film coatings from compositions 1, 2, 4, and 5, i.e. dust free within 5 min vs about 10 min for compositions 1, 2, 4, and 5.

The results in Table 1 also show the importance of the polyhydroxyl-tertiary amine (oligomer 2) in providing these improvements, e.g. Examples 1, 2, 4, and 5 have no oligomer 2. Composition 2 contains oligomer 1, which provides hydroxyl groups present with acrylic polymer 1. In comparison with the results shown for composition 3 (the invention), however, it is apparent that the hydroxyl groups provided by the oligomer 2 are much more effective in reducing water spot and increasing hardness early. These advantages are obtained without sacrifice in potlife, which is greater than 30 min, and without sacrifice in film coating quality, i.e. the film coating is smooth and glossy, with high DOI and no die back.

Example 2

Acrylic polymer 2 was prepared as described for acrylic polymer 1 from the following ingredients:

| | Parts By Weight |
|---|---|
| Portion 1 | |
| Xylene | 55 |
| Portion 2 | |
| Methyl ethyl ketone | 10 |
| Styrene monomer | 15 |
| Isobutyl methacrylate monomer | 32 |
| Methyl methacrylate monomer | 5 |
| Hydroxy ethyl methacrylate monomer | 20 |
| Isobornyl methacrylate monomer | 23 |
| 2-ethyl hexyl methacrylate monomer | 5 |
| Portion 3 | |
| T-butyl peracetate solution (75% solids in mineral spirits) | 2.5 |
| Total | 167 |

Acrylic polymer 2 had a Mw of about 8,500 and Tg of about 55° C. The resulting solution of the polymer had a solids content of 60 wt %.

Oligomer 3-1 used in this Example is the same as oligomer 1 used in Example 1. Oligomer 3-2 is the same as oligomer 1 except that trimethylolpropane instead of pentaerythritol is used in the reaction vessel. The following polyhydroxyl-tertiary amines were used in this Example as solutions (80 wt % solids) in butyl acetate:

| | Oligomer |
|---|---|
| Ethomeen ® C/12 (N(coco)N,N-diethoxylate) | 4-1 |
| Ethomeen ® O/12 (N(oley)N,N-diethoxylate) | 4-2 |
| Ethomeen ® T/12 (N(tallow)N,N-diethoxylate) | 4-3 |
| Ethomeen ® S/12 (N(soya)N,N-diethoxylate) | 4-4 |

The following concentrate of binder resin was made up:

| Concentrate 3 | |
|---|---|
| Ingredient | Parts by Weight |
| Methyl N-amyl ketone | 7.8 |
| Acrylic polymer 1 solution | 40.59 |
| Acrylic polymer 2 solution | 47.59 |
| N,N-dimethyl dodecyl amine | 0.45 |
| Tinuvin ® 292 (as described above) | 0.98 |
| Tinuvin ® 328 (as described above) | 0.98 |
| Byk ® 333 (polysiloxane-modified polyester) | 0.06 |
| Bibutyl tin laurate | 0.045 |
| Byk ® 358 (polyacrylate) | 0.33 |
| Methyl isobutyl ketone | 3.12 |
| Butyl acetate | 19.57 |
| Acetic acid | 0.29 |
| Xylene | 7.8 |
| Total | 129 |

The clear coating composition of this Example is made up of components 1 and 2, prepared using the acrylic polymer, oligomer, and concentrate described earlier in this Example, as follows:

| Component 1 | |
|---|---|
| Ingredient | Weight |
| Concentrate 3 | 129 g |
| Oligomer 3 or 4 | 7.86 g |
| Total | 136.86 g |

| Component 2 | |
|---|---|
| Ingredient | Parts by Weight |
| Desmodur ® N-3300 (as described above) | 27 |
| Desmodur ® Z-4470 BA (as described above) | 7.33 |
| Butyl acetate | 11.68 |
| Methyl ethyl ketone | 18.16 |
| Total | 64.17 |

Components 1 and 2 are mixed together (VOC content less than 0.6 kg/l.) and sprayed onto test panels, giving the compositions and test results shown in Table 2 (Compositions 3–6 are compositions of the present invention).

TABLE 2

| Composition | 1 | 2 | 3 | 4 | 5 | 6 |
|---|---|---|---|---|---|---|
| Acrylic polymer 1 | 44 | 44 | 44 | 44 | 44 | 44 |
| Acrylic polymer 2 | 50 | 50 | 50 | 50 | 50 | 50 |
| Oligomer 3-1 | 6 | 0 | 0 | 0 | 0 | 0 |
| Oligomer 3-2 | 0 | 6 | 0 | 0 | 0 | 0 |
| Oligomer 4-1 | 0 | 0 | 6 | 0 | 0 | 0 |
| Oligomer 4-2 | 0 | 0 | 0 | 6 | 0 | 0 |
| Oligomer 4-3 | 0 | 0 | 0 | 0 | 6 | 0 |
| Oligomer 4-4 | 0 | 0 | 0 | 0 | 0 | 6 |
| IPDI trimer | 15 | 15 | 15 | 15 | 15 | 15 |
| Waterspot at ambient temperature 77° F. (25° C.)/79% RH | | | | | | |
| After 30 min | 4 | 4 | 7 | 5 | 5 | 6 |
| After 60 min | 8 | 8 | 10 | 10 | 10 | 9.9 |
| After 75 min | 9.5 | 9 | 10 | 10 | 10 | 10 |
| Persoz Hardness (sec) | | | | | | |
| After 3 hr | 39 | 37 | 40 | 51 | 44 | 49 |
| After 24 hr | 195 | 176 | 138 | 148 | 154 | 149 |

In Table 2, the amounts of all ingredients are stated in terms of % solids. Compositions 3–6 were free of water spot damage in 1 hr after application of the composition to the test panel, as compared to compositions 1–2 which were not entirely free of water spot damage even at 75 min. The film coatings for compositions 3–6 showed similar advantage in becoming dust-free much quicker than for compositions 1 and 2 (5 min vs 10 min). The early hardness achieved by the compositions of the present invention was at least as good (composition 3) and better (compositions 4–6) as the comparison compositions in which the oligomer contained hydroxyl groups but not the tertiary amine as did the oligomer in compositions 3–6. The film coatings of compositions 4 and 6 could be buffed in 2 hr. after application. While the hardness of the coating film after 24 hrs. for compositions is satisfactory for most applications, such hardness can be increased by replacing part of oligomer 4-1, 4-2, 4-3, or 4-3 with either oligomer 3-1 or 3-2 while still maintaining early resistance to water spot damage and improved early hardness.

Example 3

In this Example, the hydroxy component of the coating composition had the following compositions:

Component 1, Cases 7 and 8

| Ingredient | Parts by Weight | |
|---|---|---|
| | Case 7 | Case 8 |
| Xylene | 8.29 | 4.38 |
| Ethyl acetate | 3.1 | 3.1 |
| N,N-dimethyl dodecyl amine | 0.27 | 0.23 |
| Tinuvin ® 292 (as described above) | 0.73 | 0.63 |
| Tinuvin ® 328 (as described above) | 0.73 | 0.63 |
| Byk ® 333 (as described above) | 0.05 | 0.04 |
| Dibutyl tin laurate | 0.08 | 0.07 |
| Toluene | 2.9 | 2.4 |
| Methyl isobutyl ketone | 5.85 | 6.5 |
| Acetone | 24.3 | 25.6 |
| Acetic acid | 0.28 | 0.24 |
| Methyl amyl ketone | 9.1 | 5.1 |
| Byk ®0 358 (as described above) | 0.3 | 0.26 |
| Acrylic polymer 1 solution | 61.8 | 58.1 |
| Ethoduomeen ® T/13 (oligomer 2) | 0 | 0.7 |
| Butyl acetate | 12.3 | 6.2 |
| Triethylenediamine | 0.06 | 0.06 |
| Totals | 130.1 | 114.2 |

Component 2 had the following composition:

| | Parts by Weight |
|---|---|
| Desmodur ® N-3000 (as described above) | 62.6 |
| Desmodur ® Z-4470 BA (as described above) | 15.7 |
| Butyl acetate | 7.5 |
| Methyl amyl isoketone | 14.2 |
| Total | 100 |

The following coating compositions (VOC content less than 0.6 kg/l.) were prepared by mixing together components 1 and 2:

| Composition | Component 1 - g | Component 2 - g |
|---|---|---|
| Using case 7 comp. | 54 | 16 |
| Using case 8 comp. | 60 | 10 |

These compositions had contained the following:

| Composition (wt %) | Using Case 7 Comp. | Using Case 8 Comp. |
|---|---|---|
| Acrylic polymer 1 | 100 | 98 |
| Oligomer 2 | 0 | 2 |
| IPDI trimer* | 15 | 15 |

*The wt % IPDI trimer is based on the total weight of polyisocyanate.

The case 8 composition is a composition of the present invention. Within one hour after spraying this composition onto a test panel, followed by air drying, the resultant coating film was both buffable and wet sandable. This indicates that the coating film was very quickly dust-free (within 5 min), was water-spot free and had a Persoz hardness of at least 35 sec. In comparison, the coating film using the case 7 composition of component 1, was too soft to be buffed at one hour after application, and was not ready for buffing until many hours after application. Drying at ambient temperature was used for both coating films.

Example 4

The polyhydroxyl-tertiary amine (Oligomer 5) used in this Example was prepared by charging the following constituents into a reaction vessel equipped with a thermometer, stirrer, addition funnels, heating mantle, reflux condenser and a means of maintaining a nitrogen blanket over the reactants. The flask was held under nitrogen positive pressure and the following ingredients were added and heated to 60° C.

| Ingredient | Parts by Weight (grams) |
|---|---|
| 4,4'-methylenebis(cyclohexylamine) | 210 |
| salicylic acid | 2.49 |
| propyleneglycol monomethylether acetate | 100 |

To the reaction vessel, 288 grams of butylene oxide was then added over 2 hours while maintaining a batch temperature of 60° C. After the addition, the batch temperature was raised to 120° C. over a period of 5 hours and held at 120° C. for an additional 2 hours. The batch was then cooled to 25° C. The resulting solution of oligomer had an 81.5% by wt. solids content.

The resulting oligomer 5 was a tetra-beta-aminohydroxy-substituted molecule, namely tetrabutylhydroxylate of 4,4'-methylenebis (cyclohexylamine).

A clear coating composition was prepared by first preparing the two components described below.

The hydroxy component prepared from concentrate had the following composition:

Concentrate 1

| Ingredient | Parts by Weight (grams) |
|---|---|
| Methyl ethyl ketone | 6.33 |
| Dibutyl tin dilaurate | 0.05 |
| Methyl N-amyl-ketone | 4.26 |
| Byk ® 358 (as described above) | 0.61 |
| Methyl isobutyl ketone | 1.47 |
| Acrylic polymer 2 solution (as described above) | 26.75 |
| N,N-dimethyl dodecyl amine | 0.39 |
| Acrylic polymer 3 solution (as described above) | 23.05 |
| Acrylic polymer 1 solution (as described above) | 27.64 |
| Tinuvin ® 292 (as described above) | 1.27 |
| Tinuvin ® 328 (as described above) | 1.33 |
| Acetic Acid | 0.34 |
| Triethylene diamine | 0.10 |
| Byk ® 333 (polysiloxane polyester as described above) | 0.09 |
| Xylene | 6.31 |
| Total | 100 |

The above concentrate was then used to form the hydroxy component of the following clear coating compositions:

Component 1, Cases 9 and 10

| Ingredient | Parts by Weight (grams) | |
|---|---|---|
| | Case 9 | Case 10 |
| Concentrate 1 | 90.21 | 90.21 |
| Oligomer 5 (from above) | 0.00 | 8.12 |
| Oligomer 1 (from Example 1) | 8.12 | 0.00 |
| Butyl Acetate | 1.67 | 1.67 |
| Total | 100 | 100 |

The isocyanate component had the following composition:

Component 2

| Ingredient | Parts by Weight |
|---|---|
| Desmodur ® N-3000 (as described above) | 78.96 |
| Desmodur ® Z-4470 BA (as described above) | 19.8 |
| Methyl isobutyl ketone | 10.0 |
| Methyl amyl isoketone | 42.91 |
| Butyl acetate | 49.46 |
| Xylene | 25 |
| Total | 226.13 |

The following clear coating composition (VOC content less than 0.6 kg/l.) was prepared by mixing together components 1 and 2:

| Coating Composition | Parts by Weight (grams) | |
|---|---|---|
| | Case 9 | Case 10 |
| Component 1, Case 9 or 10 | 120 | 120 |
| Component 2 | 80 | 80 |

The compositions were applied to test panels and dried at ambient temperature. The test results are:
Water spot at ambient temperature 77° F. (25° C.)/79% RH

| | Case 9 | Case 10 |
|---|---|---|
| After 30 min | 3 | 4 |
| After 60 min | 8 | 10 |
| Persoz Hardness (sec) | | |
| After 3 hr | 31 | 36 |

The above results show that the composition of the present invention (composition 10) using the oligomer containing amine and hydroxyl groups achieved much better early resistance to water spotting and much better early film hardness, as compared to the clear coat (composition 9) in which the oligomer contained hydroxyl groups but not the tertiary amine.

What is claimed is:

1. A liquid coating composition containing a film forming binder and a volatile organic liquid carrier, wherein the binder contains:

(A) hydroxyl-containing acrylic polymer and polyhydroxyl-tertiary amine with at least two hydroxyl groups of said amine being bonded to a nitrogen atom of said amine through a chain containing at least two carbon atoms, and (B) organic polyisocyanate, the ratio of equivalents a of isocyanate in (B) per equivalent of hydroxyl groups in (A) being in the range of 0.5/1 to 3.0/1, and (C) an effective amount of catalyst in the liquid composition to cure said composition, wherein said composition cures by air-drying an ambient or elevated temperature, and wherein said polyhydroxyl-tertiary amine has the formula:

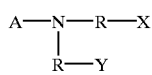

wherein R is alkylene or oxyalkylene containing 0 to 6 carbon atoms and X and Y are independently $R_1H$, herein $R_1$ is $-(CH_2C([CH_2]_mCH_3)HO)_n-$, or $-(CH_2C(C_6H_{11})HO)_n-$, or any combination thereof, wherein n is an integer of 1-3, m is an integer of 1-5, A is R—X, R—Y, $R_2$ or Z, wherein $R_2$ is an alkyl group containing 1-20 carbon atoms and Z is:

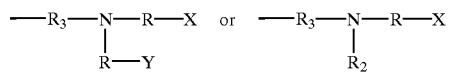

wherein $R_3$ is an alkylene containing 1 to 10 carbon atoms or a cycloalkylene or arylene group containing 3 to 21 carbon atoms, with the proviso that at least two —OH groups are present.

2. The coating composition of claim 1, wherein the amount of said acrylic polymer is 40-99 wt % and the amount of said tertiary amine is 1-60 wt %, based on the total weight of (A).

3. The coating composition of claim 2, wherein (A) contains up to 39 wt % hydroxyl-terminated polyester, based on the total weight of(A).

4. The coating composition of claim 1, wherein said acrylic polymer is formed of copolymerized mono era of styrene; a methacrylate selected from the group consisting of methyl methacrylate, isobornyl methacrylate, cyclohexyl methacrylate, and mixtures thereof; a second methacrylate selected born the group consisting of n-butyl methacrylate, isobutyl methacrylate, ethyl hexyl methacrylate, and mixtures thereof; and hydroxy alkyl (meth)acrylate, the alkyl having born 1 to 8 carbon atoms, said acrylic polymer having a weight average molecular weight of about 2,000-13,000 and a glass transition temperature of at least 25° C.

5. The coating composition of claim 1 wherein said polybydroxyl-tertiary amine contains two tertiary amine nitrogen atoms, each having at least one hydroxyl group bonded thereto through a chain containing at least two carbon atoms.

6. The coating composition of claim 1 wherein said organic polyisocyanate contains up to 50 wt % of isophorone diisocyanate timer, based on the total weight of (B).

7. The coating composition of claim 6 wherein said organic isocyanate comprises said isophorone diisocyanate trimer and hexamethylene diisocyanate trimer.

8. The coating composition of claim 1 wherein said catalyst comprises an organotin compound.

9. The coating composition of claim 8 wherein said catalyst further comprises tertiary amine and organic acid.

10. The coating composition of claim 1 wherein the composition is a two-pack coating composition, comprising in the first pack, components (A) and (C) and in the second pack, component (B), herein the contents of each pack are mixed together just prior to use.

11. A substrate finished by the process for finishing a substrate, comprising applying a colorcoat to said substrate, applying the coating composition of claim 1 over said colorcoat to form a clear coat, and curing said clearcoat.

12. A coating composition containing a film forming binder and a volatile organic liquid carrier, said binder containing (i) hydroxyl-containing acrylic polymer and (ii) polyhydroxl-tertiary amine with at least two of the hydroxyl groups of said amine being bonded to a nitrogen atom of said amine through a chain containing only two carbon atoms and (iii) an effective amount of catalyst in the liquid composition to cure said composition, and wherein said composition cures by air-drying at ambient or elevated temperature.

13. A liquid coating composition containing a film forming binder and a volatile organic liquid carrier, wherein the binder contains:

(D) hydroxyl-containing acrylic polymer and polyhydroxyl-tertiary amine with at least two hydroxyl groups of said amine being bonded to a nitrogen atom of said amine through a chain containing at least two carbon atoms, and (E) organic polyisocyanate, the ratio of equivalents of isocyanate in (B) per equivalent of hydroxyl groups in (A) being in the range of 0.5/1 to 30/1, and (F) an effective amount of catalyst in the liquid composition to cure said composition, wherein, said composition cures by air-drying at ambient or elevated temperature and wherein said polyhydroxyl-tertiary amine has the formula:

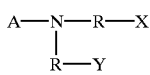

wherein R is alkylene or oxyalkylene containing 0 to 6 carbon atoms and X and Y are independently $R_1H$, wherein $R_1$ is $-(CH_2CH_2O)_n-$, $-(CH_2C(CH_3)HO)_n-$, $-(CH_2C([CH_2]_mCH_3)HO)_n-$, or $-(CH_2C(C_6H_{11})HO)_n-$, or any combination thereof, wherein n is an integer of 1–3, m is integer of 1–5, A is Z, wherein Z is:

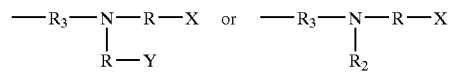

wherein $R_3$ is a cycloalkylene or arylene group containing 3 to 21 carbon atoms, with the proviso that at least —OH groups are present.

14. The coating composition of claim 13, wherein said polyhydroxyl-tertiary amine has the formula:

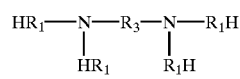

wherein $R_1$ is $-(CH_2CH_2O)_n-$, $-(CH_2C(CH_3)OH)_n-$, $-(CH_2C(CH_2CH_3)HO)_n-$, or $-(CH_2C(C_6H_{11})HO)_n-$, or any combination thereof, n is 1 or 2, and $R_3$ is a cycloalkylene radical from the group consisting of:

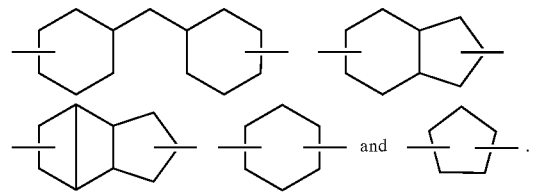

15. The coating composition of claim 14, wherein $R_3$ is:

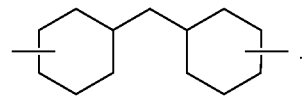

* * * * *